United States Patent Office 3,231,456
Patented Jan. 25, 1966

3,231,456
CRYSTALLINE MATERIAL AND METHOD OF MAKING THE SAME
Peter William McMillan and Brian Purdam Hodgson, Stafford, England, assignors to The English Electric Company Limited, London, England, a British company
No Drawing. Filed Nov. 24, 1964, Ser. No. 413,632
Claims priority, application Great Britain, Feb. 29, 1960, 7,087/60
9 Claims. (Cl. 161—146)

This application is a continuation in part of our earlier application Serial No. 90,210 filed February 20, 1961, now abandoned.

This invention relates to ceramic materials of the kind formed from a glass by controlled devitrification thereof and further relates to articles made from such ceramic materials and their manufacture.

The invention provides ceramic materials of the kind stated having a metallic film coating and further provides articles of such a ceramic material having a metallic film covering the whole or selected parts of its surface.

According to the present invention, a ceramic material is formed from a heat-sensitive glass by controlled devitrification thereof, the said glass containing a metallic compound which is reducible to the metal state in a reducing atmosphere and being heat treated in such a reducing atmosphere to form a metallic film on the surface of the material.

During the heat-treatment which causes the devitrification of the glass, ions of the metal used in the metallic compound diffuse to the surface of the glass and are there reduced to the metal, by reaction with the reducing atmosphere present. By this means, a metallic film is formed, which is very strongly bonded to the ceramic base material.

Known printed circuit components suffer from difficulties due to the lack of stability of the base material to which the metal, forming the printed circuit, is applied. This difficulty is particularly great when apparatus including printed circuit components has to be operated in humid conditions. Known base materials, such as resin-bonded laminates, are not resistant to high temperatures. Furthermore, with known printed circuit components, peeling of the printed metal from the base material is not uncommon, due to the difficulty of securing intimate adhesion.

It is known, for example from co-pending U.S. patent application Serial No. 90,414 to form a ceramic material form a heat-sensitive glass by a process of controlled devitrification by heating. Such a glass contains a nucleating agent, for example a phosphate nucleating agent, to catalyse the devitrification process. A ceramic material according to the present invention contains in addition a reducible metallic compound. By ion diffusion to the surface of the ceramic material and reduction there to the metallic state, an electrically conducting metal film is formed. This metal film is very strongly bonded to the ceramic base, since it is integral with the ceramic material itself and the ceramic base is stable under conditions both of high humidity and high temperature.

Particularly suitable metals for the development of adherent films on ceramics produced by devitrification of glasses are copper, silver and gold. These metals are introduced in the form of compounds into the glass batch materials before melting.

Two ranges of glass compositions are especially applicable to the present process and are set out below as representing the most important examples.

The first range (Composition A) has the following major constituents:

| | Weight percent |
|---|---|
| $Li_2O$ | 0.1–27.0 |
| $MgO$ | 0.1–32.0 |
| $Al_2O_3$ | 0.1–36.0 |
| $SiO_2$ | 45.0–88.0 |
| $SnO$ | 0.1–2.0 |
| $CuO$ | 0.5–7.5 |
| $P_2O_5$ | 0.5–6.0 |

The above major constituents total at least 90% of the composition, by weight.

In addition to the above major constituents, various constituents of secondary importance may be present, as follows:

| | Weight percent |
|---|---|
| (i) Alkali metal oxides ($Na_2O$ or $K_2O$) | [1]0.1 to 5 |
| (ii) Zinc oxide (ZnO) | 0.1 to 10 |
| (iii) Boric oxide ($B_2O_3$) | 0.1 to 10 |
| (iv) Alkaline-earth oxides (CaO or BaO) | [1]0.1 to 5 |

[1] Either alone or combined.

The second range (Composition B) has the following major constituents:

| | Weight percent |
|---|---|
| $Li_2O$ | 2.0–27.0 |
| $ZnO$ | 5.0–59.0 |
| $SiO_2$ | 0.1–2.0 |
| $CuO$ | 0.5–7.5 |
| $P_2O_5$ | 0.5–6.0 |

The above major constituents total at least 90% of the composition by weight.

In addition to the above major constituents, various constituents of secondary importance may be present, as follows:

| | Weight percent |
|---|---|
| (i) Alkali metal oxides ($Na_2O$ or $K_2O$) | [1]0.1 to 5 |
| (ii) Aluminum oxide ($Al_2O_3$) | 0.1 to 10 |
| (iii) Magnesium oxide (MgO) | 0.1 to 10 |
| (iv) Alkaline-earth oxides (CaO or BaO) | 0.1 to 5 |

[1] Either alone or combined.

Examples of ceramic materials and articles made from such ceramic materials will be described in greater detail below, but the examples given are not exhaustive either of the ceramic materials or of their applications.

The percentage chemical compositions by weight of typical examples of heat-sensitive glasses which have been found satisfactory, are as follows:

| Composition A | I | II | III | Composition B | IV | V | VI | VII | VIII | IX | X | XI | XII | XIII |
|---|---|---|---|---|---|---|---|---|---|---|---|---|---|---|
| $SiO_2$ | 62.8 | 63.7 | 80.1 | $SiO_2$ | 59.0 | 58.4 | 59.0 | 59.3 | 56.6 | 70.7 | 75.9 | 70.7 | 55.1 | 68.3 |
| $Li_2O$ | 17.7 | 18.0 | 10.7 | $Li_2O$ | 9.8 | 9.7 | 9.8 | 9.9 | 9.4 | 10.3 | 11.6 | 10.3 | 23.1 | 10.0 |
| MgO | | | 3.6 | ZnO | 26.6 | 26.3 | 26.6 | 26.7 | 25.5 | 10.3 | 5.3 | 10.3 | 15.8 | 12.7 |
| $Al_2O_3$ | 10.7 | 10.9 | | $P_2O_5$ | 2.6 | 2.6 | 2.6 | 2.6 | 2.5 | 2.6 | 1.8 | 2.6 | 3.0 | 3.0 |
| $P_2O_5$ | 4.3 | 4.4 | 2.6 | CuO | 2.0 | 2.0 | 1.0 | 0.5 | 5.0 | 2.0 | 2.0 | 2.0 | 2.0 | 2.0 |
| CuO | 3.5 | 2.0 | 2.0 | SnO | | 1.0 | 1.0 | 1.0 | 1.0 | 1.0 | 1.0 | 1.0 | 1.0 | 1.0 |
| SnO | 1.0 | 1.0 | 1.0 | $K_2O$ | | | | | | 3.1 | 2.4 | 3.1 | | 3.0 |

For the prepartion of these glasses, the following raw materials were used:

Ground quartz $SiO_2$
Lithium carbonate $Li_2CO_3$
Zinc oxide $ZnO$
Zinc orthophosphate $Zn_3(PO_4)_2$
Magnesium oxide $MgO$
Aluminum oxide $Al_2O_3$
Lithium orthophosphate $Li_3PO_4$
Cupric oxide $CuO$
Cupric carbonate $CuCO_3$
Cupric nitrate $Cu(NO_3)_2 3H_2O$
Stannous oxide $SnO$ The lithium orthophosphate and zinc orthophosphate are alternative sources of the phosphorous pentoxide in the glass compositions and both materials act as nucleating agent for the controlled devitrification process. Cupric oxide, cupric carbonate and cupric nitrate act as alternative sources of the cupric oxide in the glass compositions.

Other raw materials than those quoted above can be used for the formulation of the glass batch, provided they are of glass-making quality. For example, a good quality glass-making sand can be used in place of ground quartz as the source of silica. Similarly, part of the lithium oxide content of the glass can be derived from a suitable lithium-bearing mineral such as ground petalite.

The glass batch is prepared by thoroughly mixing the required proportions of the raw materials together with 5 percent by weight of water. This prevents demixing of the glass and aids in the reactions during glass-melting.

The glass is melted in an electrically heated furnace or a gas-fired furnace at a temperature of from 1,250° C. to 1,450° C., using crucibles made from a refractory material containing a high proportion of zircon, sillimanite or other suitable refractories for glass melting. The glass is maintained at the melting temperature until it is free from unreacted batch materials and gas bubbles. The refined glass is then worked into the required shapes by casting, pressing or other glass shaping techniques.

The glass articles are transferred to an annealing furnace maintained at a temperature of 20° C. below the "Mg point" of the glass (450° C.–650° C.). The glass is held at this temperature for approximately 1 hour and then cooled slowly to room temperature to anneal it.

The surface of the glass on which the metal film is ultimately required, may be ground and polished if desired although this is not an essential feature of the process, since the metal film develops quite readily on the fire-finished glass surface formed during the shaping of the glass articles.

According to one satisfactory process for forming the metal film required, the glass articles are next placed in a furnace, at room temperature. A reducing atmosphere is maintained in the furnace throughout the forming operation. This is achieved by passing through the furnace chamber a flow of gas which may be hydrogen, forming gas (90% $N_2$ + 10% $H_2$) or other mixtures of nitrogen and hydrogen. The use of forming gas is preferred, since this gas is easily obtainable and can be used safely. The temperature of the furnace is raised at a rate not exceeding 2° C. per minute to a temperature in the region of the "Mg point" of the glass and this temperature is held for at least 1 hour. The temperature is again raised at a rate not exceeding 5° C. per minute to the final crystallisation temperature, which is from 850° C. to 1,050° C., depending upon the composition of the glass, and this temperature is maintained for at least 1 hour. The furnace temperature is then lowered to room temperature. The rate of cooling is not critical but is not normally greater than 10° C. per minute. The reducing atmosphere is maintained in the furnace chamber until the temperature has fallen to below 150° C.

According to an alternative and proferred process, improved films are produced if an oxidising atmosphere is employed during the low-temperature regions of the heat-treatment cycle. A reducing gas atmosphere is still employed during the high temperature regions of the cycle and during the cooling stage.

In this alternative process, the glass articles are placed in a furnace in which is maintained an oxidising atmosphere, which can be oxygen, air or an oxygen-air mixture. The furnace temperature is raised at a rate not exceeding 2° C. per minute to a temperature in the region of the "Mg point" of the glass and this temperature is maintained for at least 1 hour. The temperature is again raised at a rate not exceeding 2° C. per minute to a temperature 50° C. to 200° C. above the "Mg point" of the glass. This temperature is maintained for at least 1 hour. At the end of this period, the furnace atmosphere is then purged with nitrogen and a reducing gas atmosphere of the type described above is substituted. Thereafter the procedure exactly follows that of the process described above.

This alternative forming process is illustrated by the following example:

A mixture of raw materials to give Glass Composition II, tabulated above, is melted in a refractory crucible containing a high proportion of zircon at 1300° C. until the glass is properly refined. The glass is shaped by standard procedures and annealed for 1 hour at 480° C. followed by slow cooling, the rate not exceeding 5° C. per minute.

The glass articles are then placed in a furnace, at room temperature, in which is maintained an atmosphere of oxygen. The furnace temperature is raised at a rate not exceeding 5° C. per minute to 500° C. and this temperature is held for 1 hour. The temperature is then further raised at a rate not exceeding 5° C. per minute to 600° C. and this higher temperature is maintained for 1 hour. At the end of this period, the furnace atmosphere is rapidly purged with nitrogen and a forming gas atmosphere is then introduced. The heat treatment is then continued by raising the temperature at a rate not exceeding 5° C. per minute to the final crystallisation temperature of 850° C. This final temperature is maintained for 1 hour and the temperature is then reduced at a rate not exceeding 10° C. per minute to room temperature. The reducing atmosphere is maintained in the furnace until its temperature has fallen below 100° C.

The material at the completion of this heat treatment cycle has been converted into a refractory ceramic. Samples etched in 2 percent hydrofluoric acid for about 50 minutes have exposed a highly reflecting copper layer with good electrical conductivity.

A variation of the foregoing process is to omit the annealing process described previously and to transfer the glass articles straight from the shaping operation to a furnace held at the "Mg point" of the glass, in which is maintained a reducing or oxidising atmosphere. The heat-treatment is thereafter exactly as described for one or other of the alternative heat-treatment processes detailed above.

During heat-treatment of the glass after the annealing process in the foregoing manner, controlled devitrification takes place. This is catalysed by nuclei which are precipitated during the initial holding period. During the subsequent heating, crystallisation of the glass takes place so that the final material is largely crystalline, with a small proportion of residual glass phase. During the heat-treatment, copper ions diffuse to the surface of the glass and are there reduced to metallic copper by reaction with hydrogen in the furnace atmosphere. While it is not essential, it has been found that the inclusion of a small amount of stannous oxide up to 2% in the glass aids the subsequent reduction process (e.g. glasses of Examples I to III, and V to XIII).

The glass is thus converted into a micro-crystalline ceramic material covered with a strongly adherent film of copper. At this stage, the copper film apparently has a low conductivity. This is because it is covered by an insulating layer, which may be siliceous in nature, since this layer is soluble in dilute hydrofluoric acid. Immersion of the material in weak (2%) hydrofluoric acid for a suitable period, usually from about five minutes up to about sixty minutes, depending upon the composition of the material, exposes the copper layer as a highly reflecting layer and this layer has then a high electrical conductivity. The resistivity of this layer between electrodes 1 cm. long spaced 1 cm. apart ranges from 0.04 to 1 ohm, approximately.

Thicker films, of lower electrical resistivities, can be developed on the metallised materials prepared in the foregoing manner by the use of conventional electrochemical plating techniques.

Using the process described above, ceramic plates or other shapes, provided with a firmly adherent metal film such as copper, and suitable for use in the production of printed circuit components or other devices, can be manufactured. The ceramics underlying the metal films have microcrystalline structures and they are mechanically strong. They have zero porosity and are electrically insulating. In addition, the ceramics are fairly refractory, since they will resist deformation under the action of light loads up to temperatures of 850° C. or higher.

Devices comprising ceramic materials according to the invention, wherein the base ceramic material is provided with a metal film over the whole of its surface, may include parts for brazed ceramic-to-metal seals. Further devices are parts for ceramic capacitors and the ceramic material may be shaped to form plates or tubes of this purpose.

For printed circuit components, or for other applications, where the metal film is required to cover only selected areas of the base material, it is necessary to remove the metal film from the remaining areas, thus exposing the electrically insulating ceramic surface in these latter areas. This is achieved by etching the metal film from the regions where it is not required, using suitable reagents. The metal film on the required areas is previously protected by a coating which is resistant to the etching reagent. This protective coating can be selectively applied by photographic or other means well known to those skilled in the art.

Components prepared in this way are etched for a short period in a suitable reagent. For example, copper coated ceramics are etched in ferric chloride solution (42° Baumé) for 2 minutes.

What we claim is:

1. A method of producing a ceramic material from a heat-sensitive glass containing gas its major component a combination selcted from the group consisting of compositions A and B in which composition A comprises lithium oxide 0.1 to 27 weight percent, magnesium oxide 0.1 to 32 weight percent, aluminium oxide 0.1 to 36 weight percent, silicon oxide 45 to 88 weight percent, tin oxide 0.1 to 2 weight percent, copper oxide 0.5 to 7.5 weight percent, and phosphorous pentoxide 0.5 to 6.0 weight percent; and composition B comprises lithium oxide 2 to 27 weight percent, zinc oxide 5 to 59 weight percent, silicon oxide 34 to 81 weight percent, tin oxide 0.1 to 2 weight percent, copper oxide 0.5 to 7.5 weight percent, and phosphorous pentoxide 0.5 to 6.0 weight percent; the amount of said component being such that it makes up at least 90 percent by weight of the said glass, said method including the steps of melting raw materials to provide said heat-sensitive glass, heat-treating portions of said glass after solidification thereof in a reducing atmosphere, to form a metallic film on the surface of the material, said heat-treatment consisting in raising the temperature of the glass at a slow rate of up to 5° C. per minute to a first temperature in the region of maximum expansion of the glass (Mg point), maintaining said first temperature for at least one hour to nucleate the glass and to initiate crystallisation thereof, further raising the temperature slowly at a rate of up to 5° C. per minute to a temperature in the range of 850° C. to 1050 C. maintaining this higher temperature for a time sufficient to permit completion of the crystallisation process and slowly cooling the material to room temperature.

2. A method according to claim 1, in which said reducing atmosphere includes forming gas.

3. A method according to claim 1, including a further step of heat-treating said portions of the glass in an oxidising atmosphere, said further step being affected prior to the heat-treatment in a reducing atmosphere.

4. A method according to claim 3, in which the said further step consists in raising the temperature of the glass slowly to a temperature in the region of the Mg point of the glass, maintaining this temperature for a period of time, further heating the glass to a temperature 50° C. above the Mg point of the glass, maintaining this higher temperature for a period of time and replacing the oxidising atmosphere by an inert atmosphere prepartory to establishing said reducing atmosphere.

5. A method according to claim 1, for manufacturing an article of said ceramic material, including the step of shaping the article by a glass-working operation effected before the controlled devitrification of the glass material.

6. A method according to claim 1, including the step of treating after the formation of the metallic film on the surface of the ceramic material, of immersing the article in a bath of hydrofluoric acid for a time sufficient to remove any superfiicial siliceous layer from the metallic film to increase the conductivity.

7. A method according to claim 6, including the steps, effected after the formation of the metallic film, of covering the said elected parts with a coating resistant to an etching agent and removing the metallic film from the remaining parts in a bath of the etching agent other than hydrofluoric acid.

8. An article formed by the method of claim 1.

9. An article formed by the method of claim 7.

References Cited by the Applicant

UNITED STATES PATENTS

| | | |
|---|---|---|
| 2,314,804 | 3/1943 | Willson. |
| 2,348,704 | 5/1944 | Adams. |
| 2,355,746 | 8/1944 | Nordberg et al. |
| 2,649,387 | 8/1953 | Parsons et al. |
| 2,659,665 | 11/1953 | Parsons et al. |
| 2,684,911 | 7/1954 | Stookey. |
| 2,971,853 | 2/1961 | Stookey. |
| 2,999,339 | 9/1961 | Hensler. |
| 3,000,745 | 9/1961 | Cianchi. |

DONALL H. SYLVESTER, *Primary Examiner.*